United States Patent [19]

Zimmer

[11] 4,362,345
[45] Dec. 7, 1982

[54] PROVISION FOR ROTATABLE BEARING OF A CYLINDRICAL DEVICE IN A BEARING HOUSING

[76] Inventor: Peter Zimmer, Untere Sparchen 54, Kufstein, Austria, A-6330

[21] Appl. No.: 186,428

[22] Filed: Sep. 12, 1980

[30] Foreign Application Priority Data

Sep. 13, 1979 [AT] Austria ................... 6021/79

[51] Int. Cl.³ ............................................. F16C 13/00
[52] U.S. Cl. ................................ 308/207 R; 308/199
[58] Field of Search ............... 308/207 R, 10, 173, 308/245, 178, 189 R, 199, 233, 232

[56] References Cited

U.S. PATENT DOCUMENTS

| | | | |
|---|---|---|---|
| 2,682,435 | 6/1954 | Rien et al. ................ | 308/207 R |
| 3,239,288 | 3/1966 | Campbell et al. ......... | 308/199 |
| 3,291,542 | 12/1966 | North ........................ | 308/207 R |
| 3,486,212 | 12/1969 | Vannest .................... | 308/207 R |
| 3,929,389 | 12/1975 | Riegler et al. ............ | 308/207 R |
| 3,989,323 | 11/1976 | Lambert .................... | 308/207 R |

FOREIGN PATENT DOCUMENTS 332012 7/1930 United Kingdom ........... 308/207 R

*Primary Examiner*—Willis Little
*Attorney, Agent, or Firm*—Karl F. Ross

[57] ABSTRACT

A bearing assembly for a cylindrical device, which is capable of assuring rapid exchange of the cylindrical device, comprising a bearing housing surrounding an antifriction bearing cage provided with roll bodies, wherein a circular opening remains open, through which the roll bodies protrude in order to be supported at the cylindrical device to be borne. The bearing housing is subdivided into two parts or housing members in a plane passing through the axis, so that one of the parts or housing members can be swiveled against the other. Also, the antifriction bearing cage is subdivided, namely into individual cages loosely joined together.

8 Claims, 7 Drawing Figures

PROVISION FOR ROTATABLE BEARING OF A CYLINDRICAL DEVICE IN A BEARING HOUSING

FIELD OF THE INVENTION

The invention relates to a bearing assembly for a cylindrical device in and having a bearing housing and an antifriction bearing, which comprises an antifriction bearing cage provided with roll bodies.

BACKGROUND OF THE INVENTION

Antifriction bearings for supporting shafts or other cylindrical components in general comprise two rings or discs (races), respectively, on which roll bodies (balls or rollers) can run. In general, the roll bodies are supported by a cage maintaining them at a uniform distance from each other. In certain cases, the roll bodies also can run directly on the shaft (or on a cylindrical part which corresponds to the shaft) or in the bearing housing. The mounting and dismounting of shafts or other cylindrical components supported by way of antifriction bearings is usually connected with a considerable effort in mounting technology, even where antifriction bearings are employed whose race rings and cages are subdividable into two halves, as is known for example with radial antifriction bearings (compare Austrian patent disclosure AT-PS No. 177 617).

OBJECT OF THE INVENTION

It is therefore, an object of the invention to allow for rapid mounting and dismounting of a cylindrical component supported by way of an antifriction bearing, without the requiring the mounting and dismounting of the antifriction bearing at the same time.

SUMMARY OF THE INVENTION

This is achieved in accordance with the invention by having the antifriction bearing cage surrounded by the bearing housing except for a one sides circular opening. The roll bodies protrude through the circular opening in order to bear against the cylindrical component to be borne. The bearing housing is subdivided into two part bearing housings or housing members so that one of the part housings can be swiveled against the other, the antifriction bearing cage being subdivided into individual cages loosely joined sequentially.

The possibility of swinging out of one of the housing members allows for rapid lifting up of the shaft or the supported cylindrical component, respectively, in a radial direction. The bearing, closed along its periphery in the case of a closed bearing housing, can be opened in any position of the supported cylindrical component independently of the position of the roll bodies of the antifriction bearing. This has become possible only by the construction in accordance with the present invention where the antifriction bearing cage is formed by individual cages loosely joined in sequence. It is advantageous to have support means for the roll bodies or their individual cages, respectively, disposed at least in the region of the two openings of the swivellable upper part housing, which not only guarantees a reliable motion of the roll bodies of the antifriction bearing with closed bearing housing, but prevents automatically escape of the roll bodies with the individual cages from the swung out housing member. In closed position of the bearing housing the slot between the two part housings does not cause any functional disadvantages. The roll bodies pass completely unloaded over the slot, pushed by the following cage part. In contrast to the jolts felt by the wheels of railroad cars at the joints of the rails, in the antifriction bearing in accordance with the present invention the roll bodies pass over the slot between the housing members without a jolt.

The support means for the roll bodies at the open ends of the swivellable housing members are advantageously formed as mechanical support means or as switchable magnets. The magnets can also be distributed over the full swung out housing member, such that each individual roll body of magnetic material is coordinated with a magnet. The individual cages, race rings and bearing housing then comprise preferably a nonmagnetic material.

The invention can be used where frequently and in a simple way construction element supported by an antifriction bearing has to be exchanged. This is the case for example in printing presses, where a frequent change of the printing cylinder or of the circular stencils (in stencil printing machines) is required.

SPECIFIC DESCRIPTION

Figure 1:
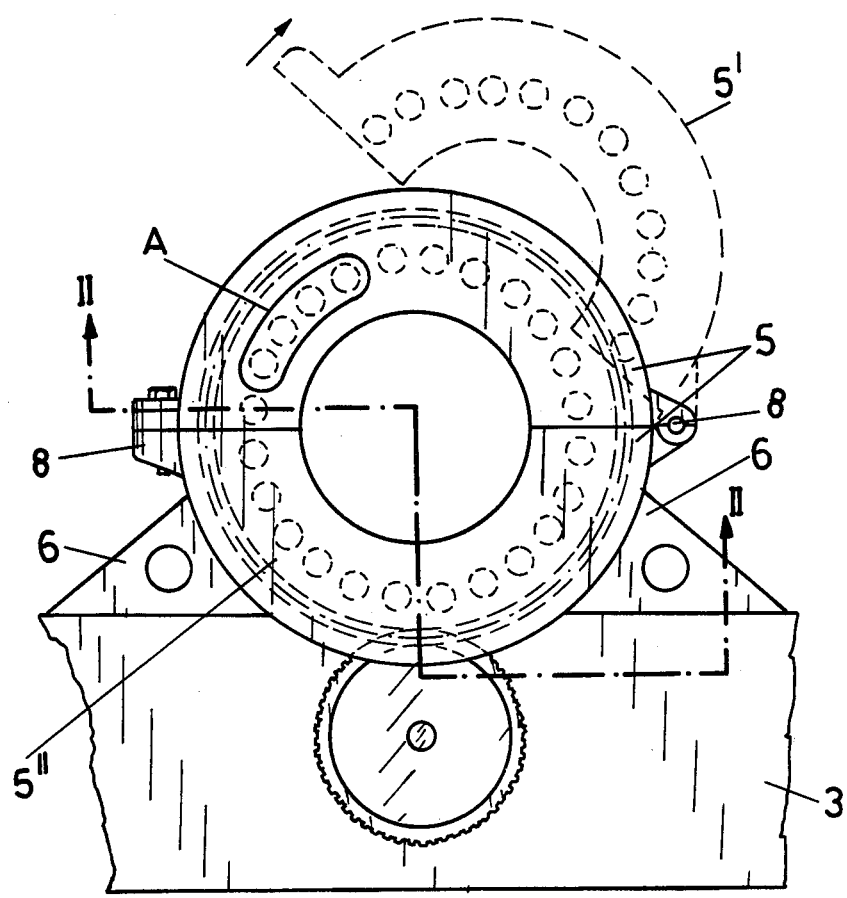
FIG. 1 is a front elevational view of a stencil station of a rotary stencil printing machine provided with a bearing assembly according to the invention.
Figure 2:
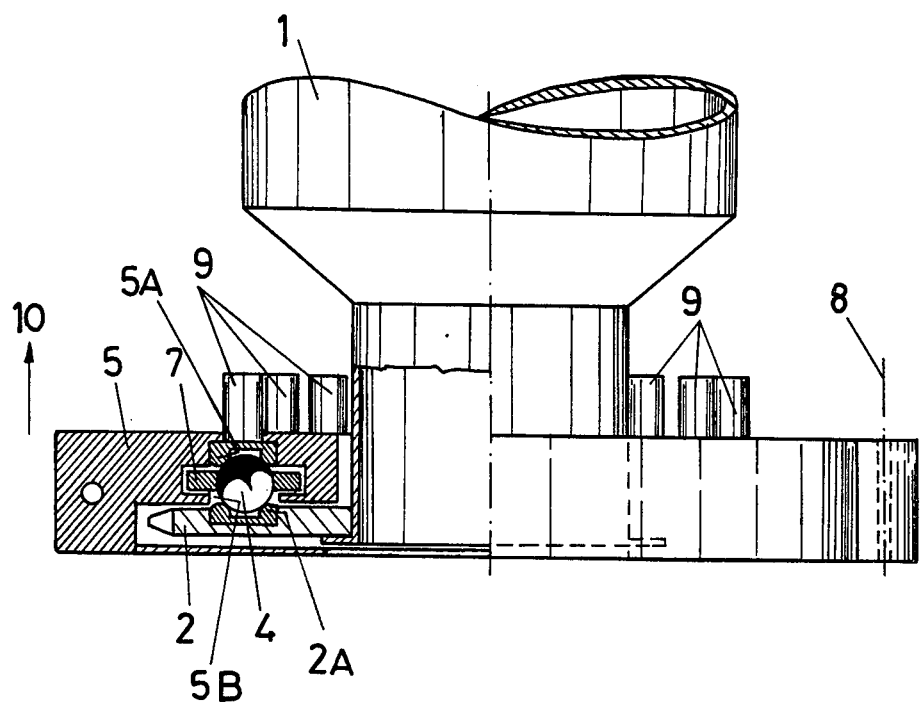
FIG. 2 is a sectional view along section line II—II of FIG. 1.

The stencil station shown in FIGS. 1 and 2 for a rotary stencil printing machine comprises a circular stencil 1 supported on the front by way of the rapport wheel (or disc) 2 via an axial antifriction bearing at the machine frame 3.

Figure 3:
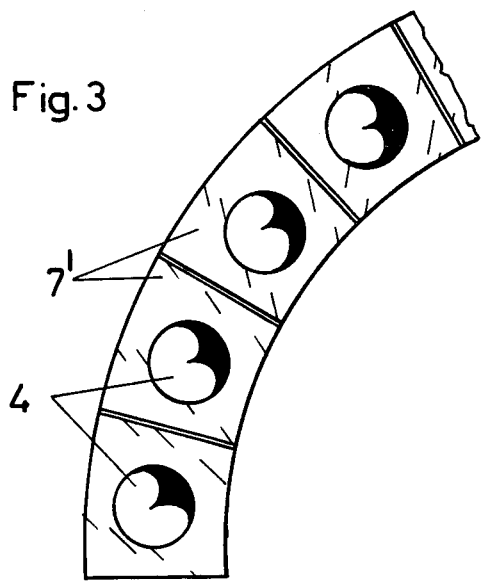
FIG. 3 is a detail view of the region A of FIG. 1 (i.e. a view of an antifriction bearing cage)

The support is provided by having the roll bodies 4 of the antifriction bearing rolling upon the race ring 2A connected to the rapport wheel 2 and upon a component rigidly connected to the machine member, the bearing housing 5 or upon the race ring 5A attached to the bearing housing. The bearing housing 5 is connected to the machine frame via supports 6. The bearing housing 5 surrounds the the antifriction bearing cage 7 such that only a one side circular opening 5B remains free through which the roll bodies 4 protrude. The antifriction bearing cage 7 comprises trapezoidal individual cages 7' for each roll body 4 (FIG. 3). The individual cages 7' fix the position of the roll body 4 in axial direction, that is in the direction parallel to the bearing axis.

As is indicated in FIG. 2 by way of the arrow 10, one of the two bearing housings is adjustable in the axial direction on the machine frame for longitudinal tensioning of the circular stencil 1.

The bearing housing 5 is subdivided into two part housings or housing members 5', 5'' by way of a plane passing through the axis, where the upper housing member 5' is provided to swing out around an axis 8 parallel to the bearing axis (see dashed line position in FIG. 1). In this position the supported roll bodies 4 together with their individual cages 7' can slide out of the bearing housing 5 or the upper part housing 5', respectively, which is prevented by the magnets 9, which are switched on automatically before the bearing housing 5 is opened, in fact as soon as the circular stencil 1 releases, that is the bearing housing 5 is repositioned in the direction of the arrow 10. Preferably, electromagnets are employable, which can be switched by a corresponding current circuit. In principle, the use of switchable permanent magnets is also possible.

The number and distribution of the magnets 9 is provided such that upon opening of the bearing housing 5 the roll bodies occupy the desired position in the two part housings 5', 5". In the embodiment shown magnets 9 are only provided for the swingable upper housing member 5' of the bearing housing 5, one magnet for each roll body 4. However, the position of one of the magnets 9 deviates from a uniform distribution of the magnets 9 in order to prevent that with switched on magnets, by chance all roll bodies 4 are disposed just between two magnets 9 and are thereby subjected only to a weak magnetic field which can put the roll bodies in a labile equilibrium. By disposing nonuniformly one of the magnets 9 a force is exerted upon the roll bodies 4 while in labile equilibrium to transfer the roll bodies 4 into a stable equilibrium where each roll body 4 is disposed in a strong magnetic field region and is safely maintained in the swung out housing. Especially when the separating plane between the two housing members 5', 5" of the bearing housing 5 does not run horizontally, it is advantageous to dispose magnets also at the lower housing member magnets in order to prevent an escape of a roll body 4 together with its cage 7' from the lower housing member. In case as shown in FIG. 1 the upper housing member 5' is of the same size as the lower (the upper housing member could also be larger than the lower) then in each housing member 5', 5" the same number of roll bodies 4 is provided.

Figure 4:
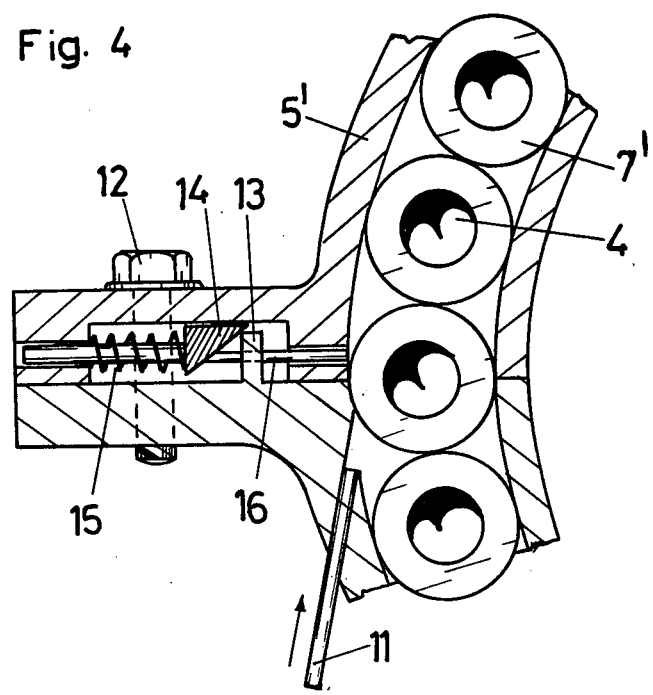
FIGS. 4, 5 and 6 show a detailed view of the stencil housing with mechanical support means for the roll bodies in three different functional positions.
Figure 5:
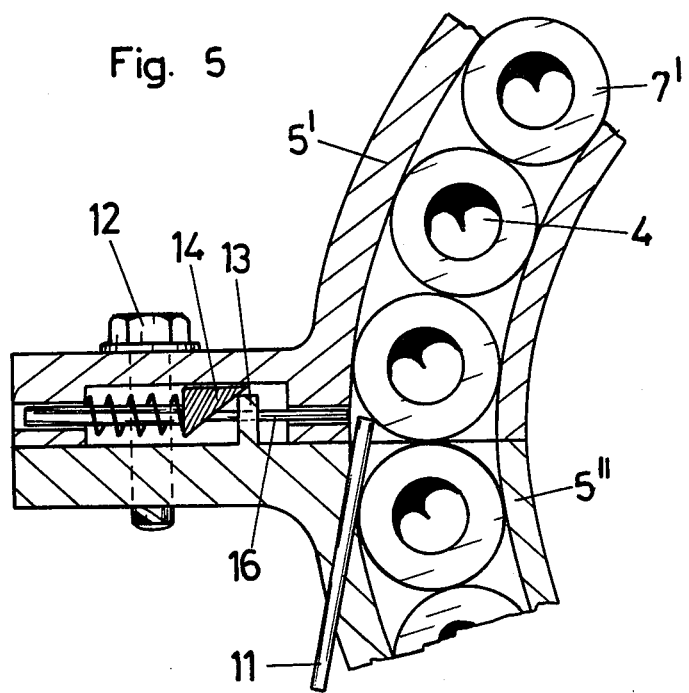
Figure 6:
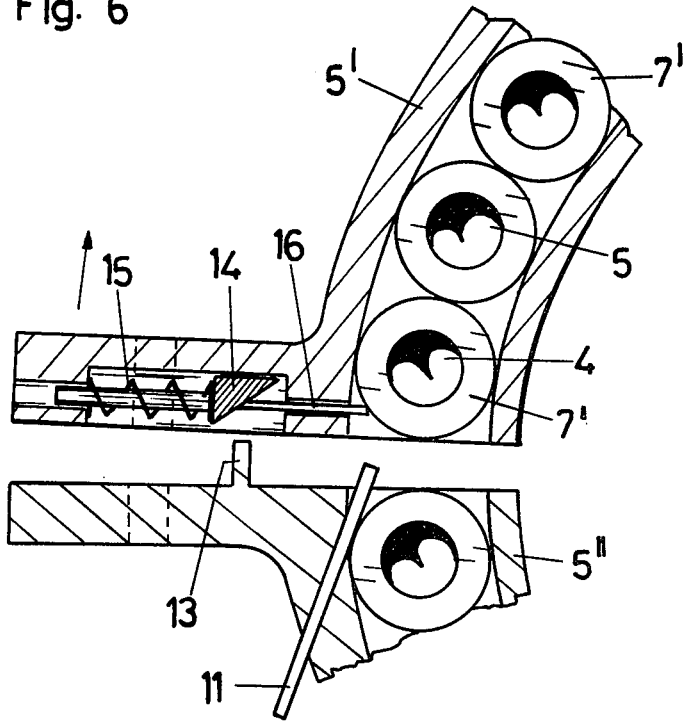
Figure 7:
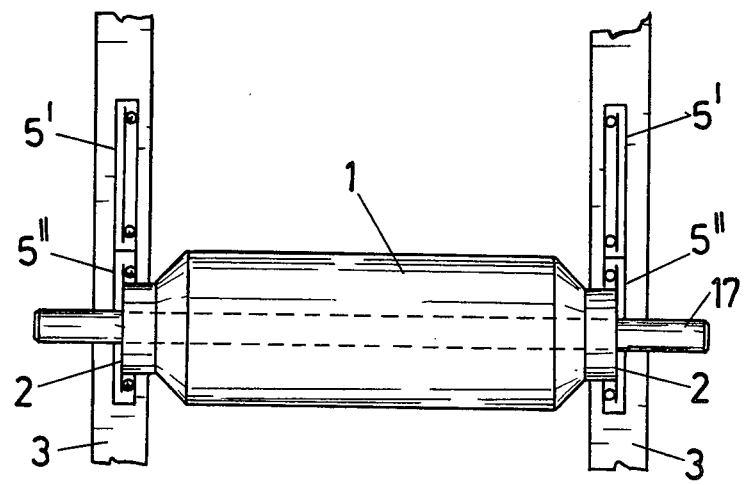
FIG. 7 is a schematic plan view of a stencil station with opened bearing cage housing.

Instead of the magnets, mechanical support means can be employed for the roll bodies 4, especially those of the upper housing member 5' as can be recognized from FIGS. 4 to 6. In the two housing member 5' and 5" of the bearing housing there are provided the roll bodies 4 with the individual cages 7', which are now formed as circular discs. It can happen that a roll body 4 with individual cage 7' is just disposed in the region of the separating plane of the two housing member 5' and 5" (FIG. 4). In this case the bearing housing should not be opened. Rather, prior to opening, the spring loaded pin 11 is inserted so that in the region of the separating plane of the two housing member 5', 5" there is disposed in each case a roll body 4 with individual cage 7' on each side of the separating plane (FIG. 5). Then the screw 12 is opened and the upper part housing 5' is swung out. In this phase the cam 13 releases the wedge 14 and the spring 15 moves the push rod 16 under the disc shaped individual cage 7' (FIG. 6). At the side opposite to the opening side of the bearing housing 5, that is where the swivel axis 8 (FIG. 1) of the two part housings is disposed, the same mechanism is provided with cam 13, wedge 14, spring 15 and push rod 16. The two push ords 16 prevent a falling of the roll body together with individual cages 7' from the open upper housing member 5'.

It can be recognized from FIG. 4 that in a stencil station with a bearing described in accordance with FIGS. 1 to 3 there is performed rapidly and simply a change in stencil: Only the upper housing member 5' of the bearing housing have to be swung out; then the circular stencil 1 with the color tube 17 can be lifted out from the top.

This advantage does not entail the disadvantage of a deficient bearing of the circular stencil 1, since with a closed bearing housing 5 the circular stencil 1 is supported at its two front ends as in usual circumferentially closed antifriction bearings in bearing housings connected to the machine frame 3.

The invention is not limited to the embodiment of an axial bearing shown or to the application in rotary stencil printing machines. The means according to the invention can in principle be realized with radial antifriction bearings and can be employed in other fields of application.

I claim:

1. A bearing assembly for a replaceable cylindrical component, comprising:
   an annular bearing housing formed by a pair of housing members and defining a separating plane, said housing being formed with a circular lateral opening;
   pivot means for swingably interconnecting said members on one side of a separating plane thereof whereby at least one of said members can be swung away from the other of said members about a pivot axis defined by said pivot means to enable removal of said component from and replacement of said component in said bearing assembly;
   a multiplicity of roll bodies spaced around said housing and protruding through said opening to bear upon said component;
   respective bearing cages individual to said roll bodies and received in said housing members, said cages being movable with said roll bodies around said housing; and
   support means for retaining said roll bodies and said cages in the respective housing members when said one of said housing members is swung away from the other of said housing members.

2. The bearing assembly defined in claim 1 wherein said housing is provided along a lateral side opposite said circular opening with a race ring, said roll bodies running along said ring.

3. The bearing assembly defined in claim 1 wherein said roll bodies consist of magnetic material, said housing consists of nonmagnetic material, said cages consist of nonmagnetic material and said support means includes magnets operable to attract said roll bodies and retain the same in said housing members.

4. The bearing assembly defined in claim 3 wherein at least one of said magnets is provided for each of said roll bodies at least on said one of said members.

5. The bearing assembly defined in claim 1 wherein said support means includes at least one pin on at least one of said members retractable from but insertable into the path of said cages for maintaining said roll bodies and said cages in the respective members upon the swinging of said one of said members away from the other of said members.

6. The bearing assembly defined in claim 1 wherein said cages are of substantially trapezoidal shape.

7. The bearing assembly defined in claim 1 wherein said cages are circular discs.

8. The bearing assembly defined in claim 1 or claim 4 wherein said component is a circular stencil of a rotary stencil printing machine having a rapport wheel and said roll bodies bear against said rapport wheel.

* * * * *